(12) United States Patent
Imai

(10) Patent No.: US 11,442,812 B2
(45) Date of Patent: Sep. 13, 2022

(54) SYSTEM AND METHOD

(71) Applicant: CANON KABUSHIKI KAISHA, Tokyo (JP)

(72) Inventor: Tetsu Imai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 408 days.

(21) Appl. No.: 16/566,789

(22) Filed: Sep. 10, 2019

(65) Prior Publication Data
US 2020/0089673 A1 Mar. 19, 2020

(30) Foreign Application Priority Data
Sep. 19, 2018 (JP) .............................. JP2018-174455

(51) Int. Cl.
*G06F 11/00* (2006.01)
*G06F 11/14* (2006.01)
*G06F 16/23* (2019.01)

(52) U.S. Cl.
CPC ...... *G06F 11/1402* (2013.01); *G06F 11/1474* (2013.01); *G06F 16/2379* (2019.01); *G06F 2201/80* (2013.01)

(58) Field of Classification Search
CPC ............. G06F 11/1474; G06F 11/0709; G06F 11/0715; G06F 11/1402; G06F 11/1443; G06F 11/302; G06F 11/0757; G06F 11/1448; G06F 2201/80; G06F 2201/86; G06F 2201/835; G06F 16/2379
See application file for complete search history.

(56) References Cited

U.S. PATENT DOCUMENTS

| | | | | |
|---|---|---|---|---|
| 2009/0204977 | A1* | 8/2009 | Tavares | G06F 9/542 719/318 |
| 2011/0040863 | A1* | 2/2011 | Griffin | H04L 67/1095 709/223 |
| 2012/0023369 | A1* | 1/2012 | Bourbonnais | G06F 11/1474 714/16 |
| 2019/0205221 | A1* | 7/2019 | Taubler | G06F 11/1471 |

FOREIGN PATENT DOCUMENTS

JP 2004-038759 A 2/2004

* cited by examiner

*Primary Examiner* — Joseph D Manoskey
(74) *Attorney, Agent, or Firm* — Canon U.S.A., Inc. IP Division

(57) ABSTRACT

If processing of a first event in response to a stream event is not normally ended due to an occurrence of an exception or a timeout, the processing is executed repeatedly during a predetermined period of time from an occurrence of the first event. Then, after the predetermined period of time passes, an error notification is issued while processing of a second event that has occurred during the predetermined period of time is executed only once.

6 Claims, 12 Drawing Sheets

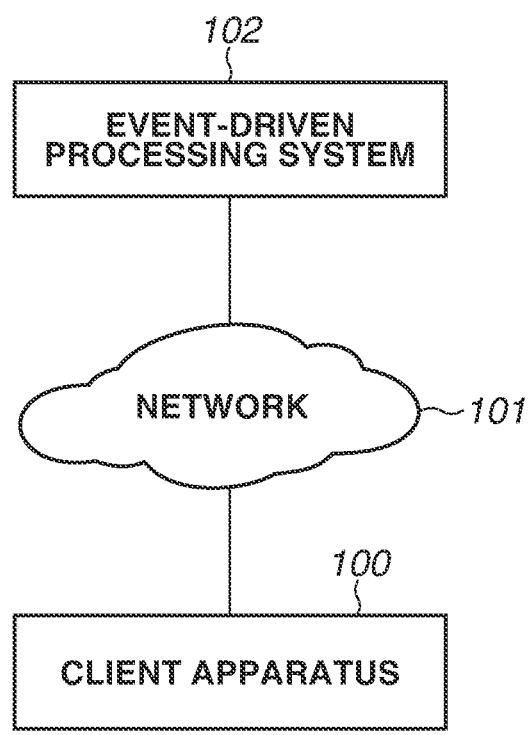

FIG.6B1
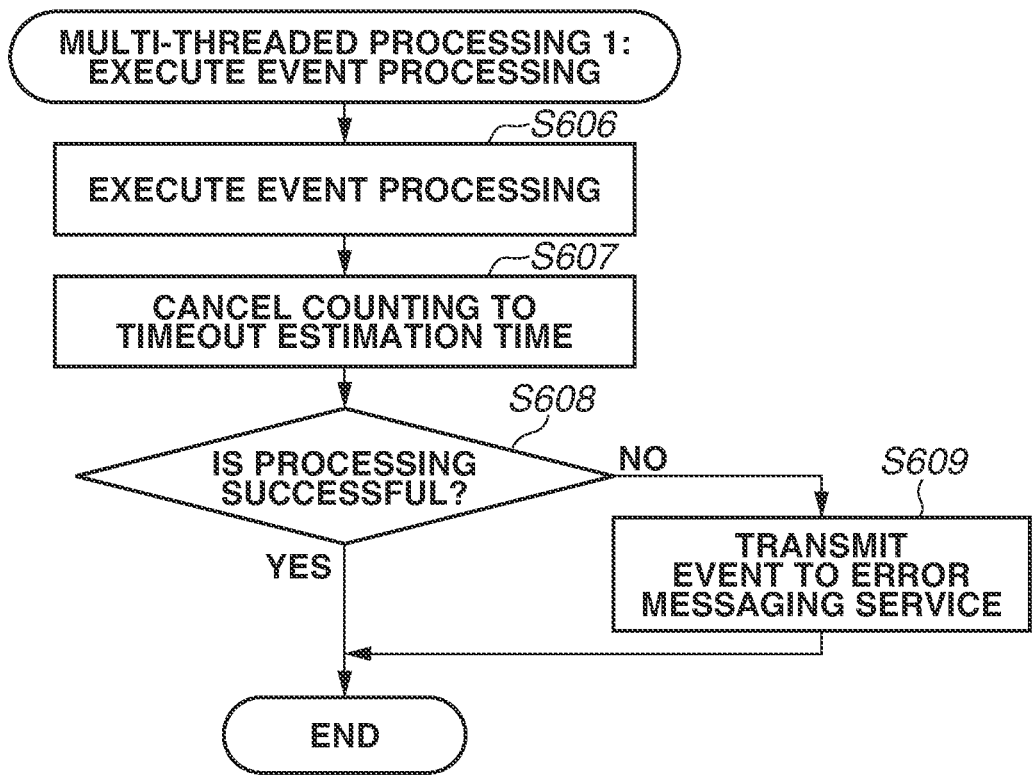
FIG.6B2
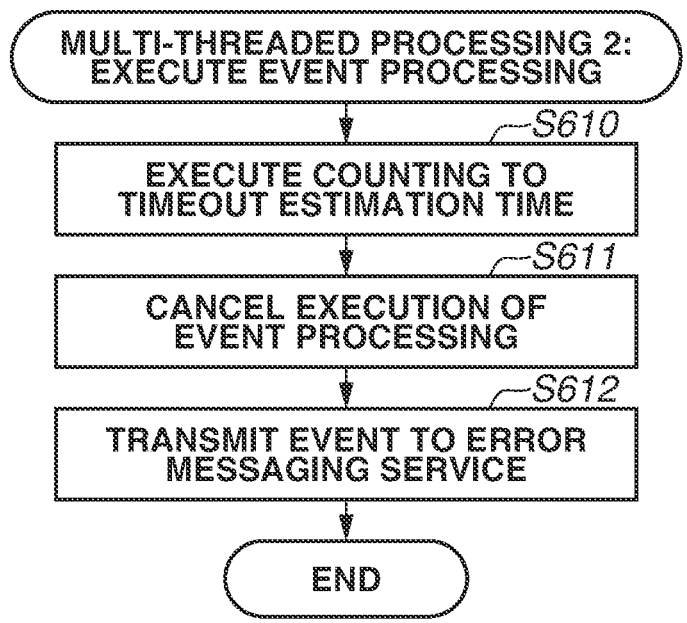

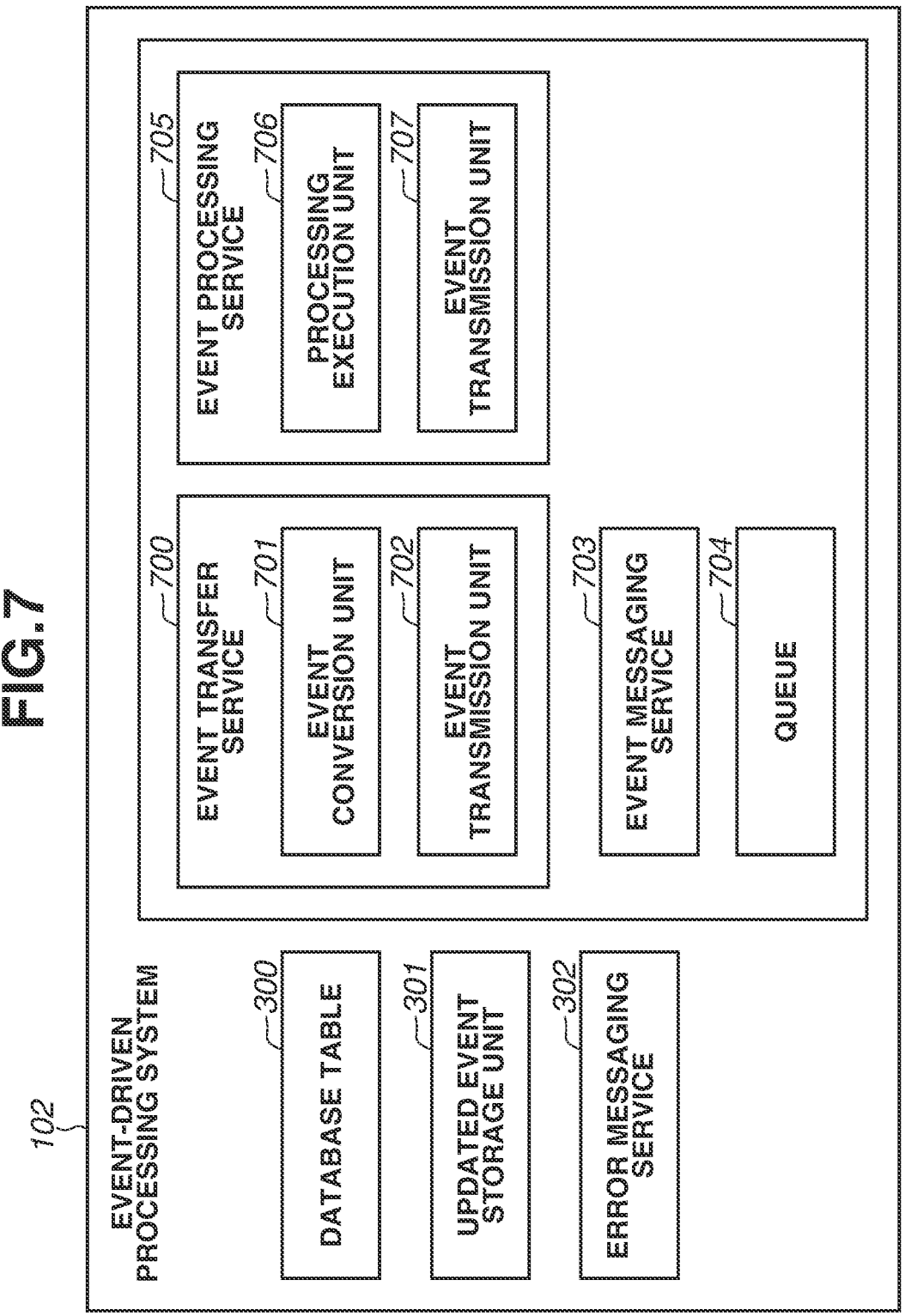

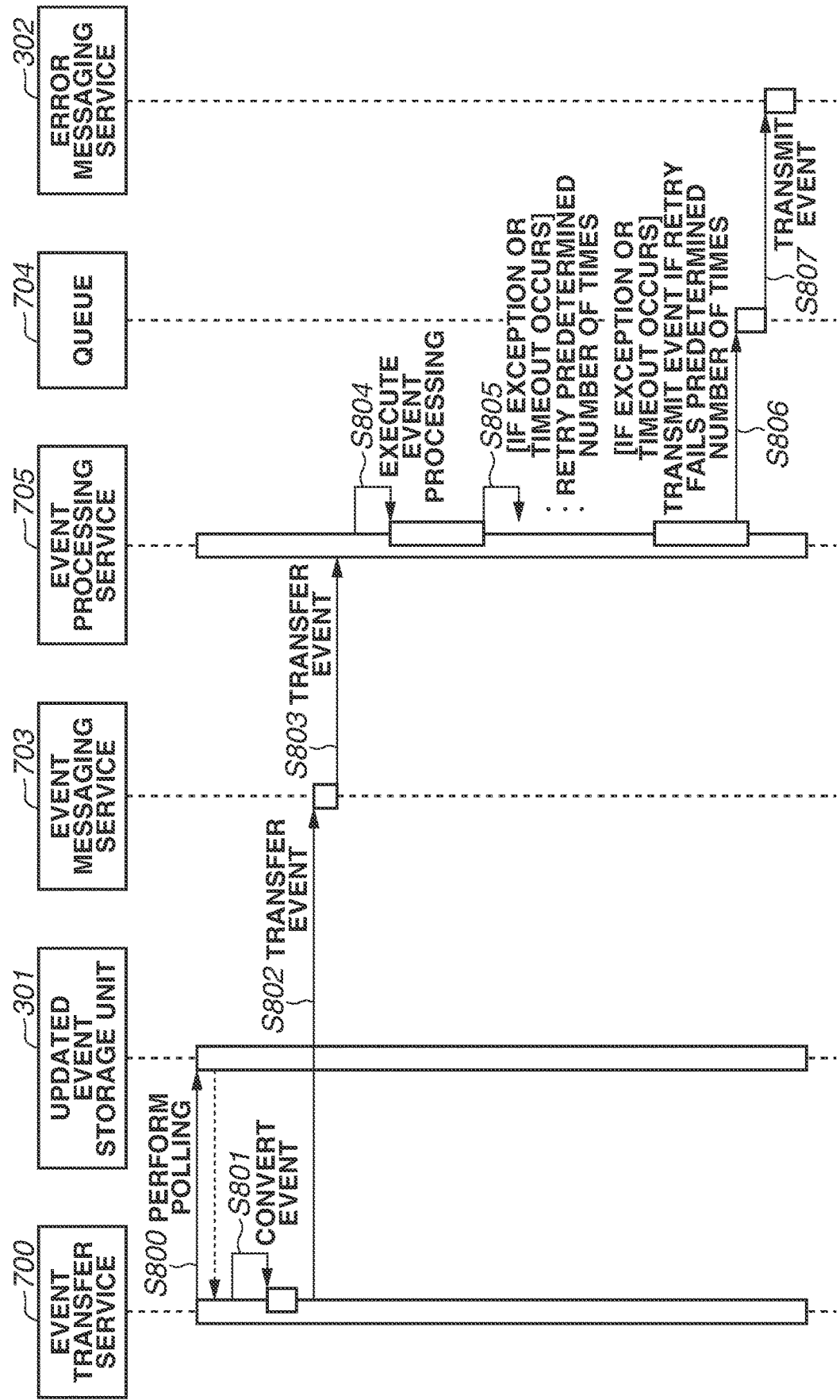

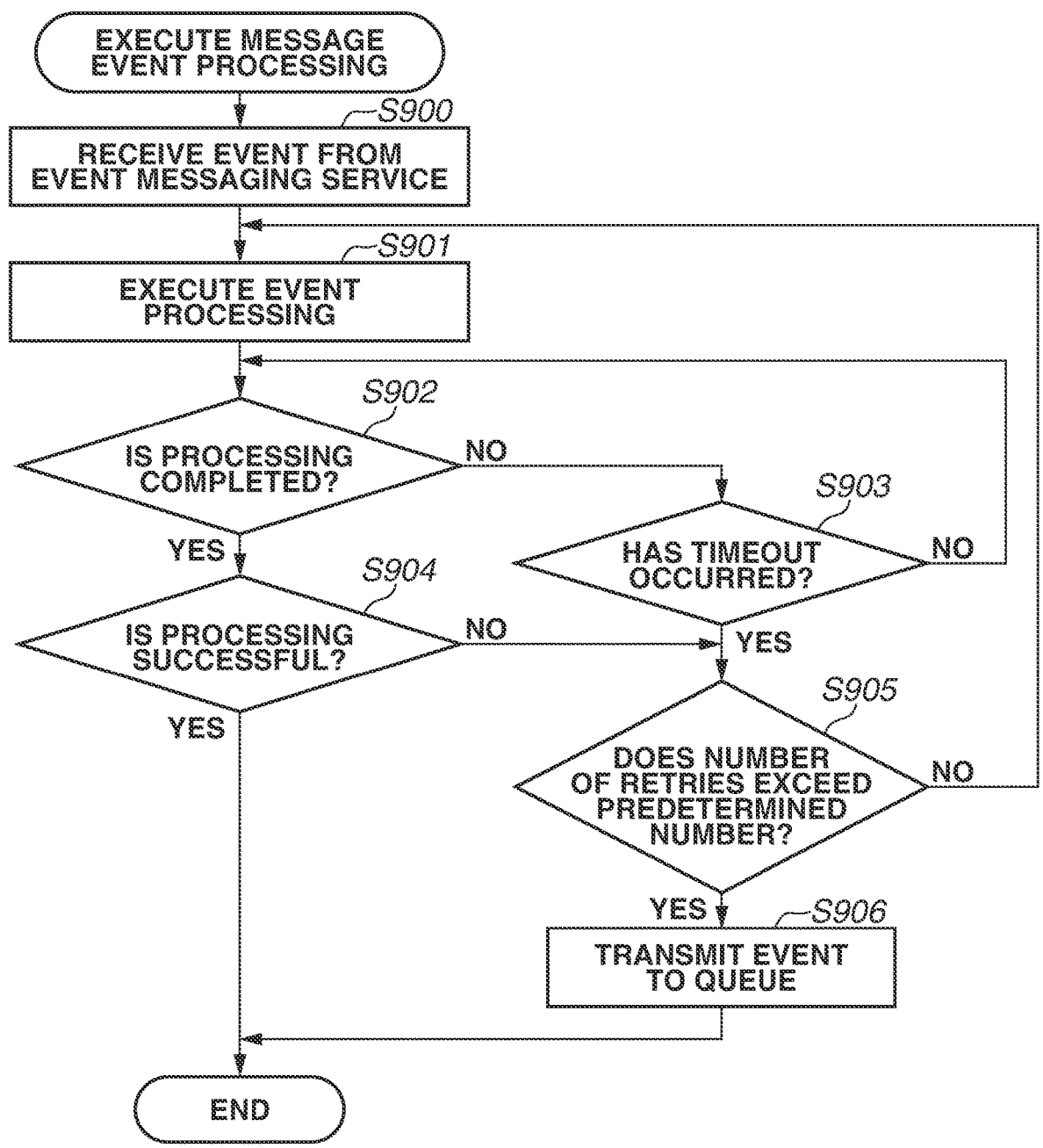

SYSTEM AND METHOD

BACKGROUND

Field of the Disclosure

The present disclosure relates to a technique for performing event processing in an event-driven service using a cloud service.

Description of the Related Art

Various cloud computing services have been available in recent years. Examples thereof include Amazon Web Services (hereinafter, referred to as "AWS"), Google Cloud Platform, and Microsoft Azure. These services have become popular by providing computing resources such as a virtual machine and a storage, and charging for the provided computing resources by unit of time based on performance and capacity that are used. By using these services, a service user can flexibly construct an information processing system such as a web system at low cost without preparing physical facilities on the user's side.

As a use example of a cloud computing service, there is a service that collects setting values of devices and applications from various devices, computer terminals, and mobile terminals connected to a network, stores the collected setting values in a storage, and manages the values in a database. In such a service, each time collected information such as a file is uploaded, a record is generated, and a file name and a storage location thereof in the storage are managed.

For example, Japanese Patent Application Laid-Open No. 2004-38759 discusses an event-driven script technique. In this technique, if specific information is updated, a pre-registered script is activated in response to an update event.

The cloud computing services also provide a service (hereinafter, referred to as "event-driven computing service") that executes light-weight processing on a specific computing resource in response to an event that occurs. Examples thereof include AWS Lambda, Google Cloud Functions, and Microsoft Azure Functions.

In such a service, a program code for implementing desired processing is pre-registered in the cloud computing service together with designated specifications of a central processing unit (CPU) and a memory of a virtual machine configured to execute the program code. Then, the registered program code is associated with the computing resource and a specific event that occurs to the computing resource.

In order to implement processing equivalent to processing implemented by an event-driven computing service, it has been necessary for a user of a conventional cloud computing service to perform development and management required to implement the processing. For example, the user needs to develop an application for detecting an event that occurs to the computing resource and for executing desired processing, and to construct and manage an infrastructure on which the application is to be operated.

However, the above-described event-driven computing services allow the user of the cloud computing service to focus only on development of the desired processing. Since the event-driven computing services provide a service in a form of charging for the provided service by unit of time based on the length of time during which the registered program code is executed, application development is facilitated also in terms of infrastructure costs.

On the other hand, the currently-available event-driven computing services exemplified by AWS Lambda have a restriction item in execution of the program code that is executed in response to an occurrence of an event. More specifically, if the processing of the program code is not completed within a length of time specified by the event-driven computing service, a timeout occurs, and the processing is ended as an error.

Thus, in addition to cases in which an exception occurs due to a defect in a program code or an event, a developer also needs to prepare for an error that occurs in a case of conflict with such a restriction item so as to promptly recover from the error, for example, by detecting the occurrence of the error or receiving a notification.

An update event (hereinafter, referred to as "stream event") that triggers the above-described event-driven computing service can be held as a stream after the occurrence. An example of the stream event is a database table update event.

In the cases of such a stream-based event, the event-driven computing service periodically polls the stream, and if there is an updated record, the event-driven computing service executes the program code that is registered in association with the record. For example, in a case in which the database table is consecutively changed within a short period of time, a plurality of stream events occurs. The event-driven computing service executes the program codes to process the stream events in chronological order.

If the processing performed by executing the program code that is triggered by the stream event fails a number of times, the event-driven computing service retries the processing on the target event until the failed event is deleted from the stream. In the case of the stream event that occurs in response to a database table update, the stream event is deleted from the stream, for example, in 24 hours. Thus, in a case of executing special processing on stream events in chronological order, if an error occurs in processing of one event, processing of the next stream event is not executed for a long period of time until the target event is deleted from the stream. In this case, the entire processing of the event-driven computing service becomes stuck.

Upon deletion of the event from the stream, the event-driven computing service no longer executes the processing on the target event. However, in this case, since it is not that the processing performed by executing the program code is unsuccessful, an error notification related to the target event is not issued.

A possible method for preventing stagnation in the processing performed by the event-driven computing service, which is triggered by the stream event, is a mechanism of retrying only for a predetermined length of time (e.g., 10 minutes). More specifically, at the time of starting processing in the event-driven computing service, a current time point is compared with an event occurrence time point managed by the database table. Control is performed in such a manner that if a difference between the current time point and the event occurrence time point is not greater than a predetermined length of time, the processing is normally performed, whereas if the difference is greater than the predetermined length of time, an error notification is issued and the processing is not performed and is ended. Accordingly, it is possible to prevent the event-driven computing service from retrying continuously until the target event is deleted from the stream.

However, in this mechanism, an issue arises if a plurality of events occurs consecutively and substantially simultaneously on the stream and if a previous event is repeatedly retried exceeding the predetermined length of time. More specifically, when the event-driven computing service acquires a subsequent event, the current time point is compared with the event occurrence time point managed by the database table, and it may be determined that the difference between the current time point and the event occurrence time point already exceeds the predetermined length of time. In other words, the subsequent event can be processed as an error without the processing, to be performed by executing the program code on the subsequent event, being tried even once by the event-driven computing service.

SUMMARY

According to embodiments of the present disclosure, a system configured to manage, for a first time length, a plurality of events issued in response to a plurality of changes made to a database and execute a code corresponding to each of the plurality of changes in response to the plurality of events to process the plurality of events in chronological order includes one or more processors, and at least one memory storing instructions, which when executed by the one or more processors, cause the system to perform control to retry event processing on a processing target event if first event processing that is started as the event processing in a case in which a difference between a current time point and a time point at which the processing target event occurs is not greater than a second time length is not normally ended, the second time length being shorter than the first time length, and execute processing for failure notification of the event processing on the processing target event if second event processing that is started as the event processing in a case in which the difference between the current time point and the time point at which the processing target event occurs is greater than the second time length is not normally ended.

Further features of the present disclosure will become apparent from the following description of exemplary embodiments with reference to the attached drawings.

BRIEF DESCRIPTION OF THE DRAWINGS

FIG. 1 is a block diagram illustrating a system configuration of an event-driven computing service.

FIGS. 6B1 and 6B2 are flowcharts illustrating a flow of processing according to the first exemplary embodiment.

FIG. 7 is a block diagram illustrating a software configuration of an event-driven processing system according to a second exemplary embodiment.

FIG. 8 is a sequence diagram illustrating an example of event processing performed by the event-driven processing system according to the second exemplary embodiment.

FIG. 9 is a flowchart illustrating a flow of processing according to the second exemplary embodiment.

DESCRIPTION OF THE EMBODIMENTS

Various exemplary embodiments of the present disclosure will be described below with reference to the drawings.

FIG. 1 illustrates a system configuration (network configuration) of an event-driven computing service according to an exemplary embodiment.

A client apparatus 100 communicates with an event-driven processing system 102 via a network 101. Examples of the client apparatus 100 include computers such as a personal computer, a laptop computer, a tablet computer, and a smartphone. Other examples include image processing apparatuses such as an office multi-function peripheral and a printer.

The network 101 is a network such as the Internet.

The event-driven processing system 102 is an information processing system including an information processing apparatus such as a server, and provides an event-driven computing service. Details of the event-driven processing system 102 will be described later.

Figure 2A:
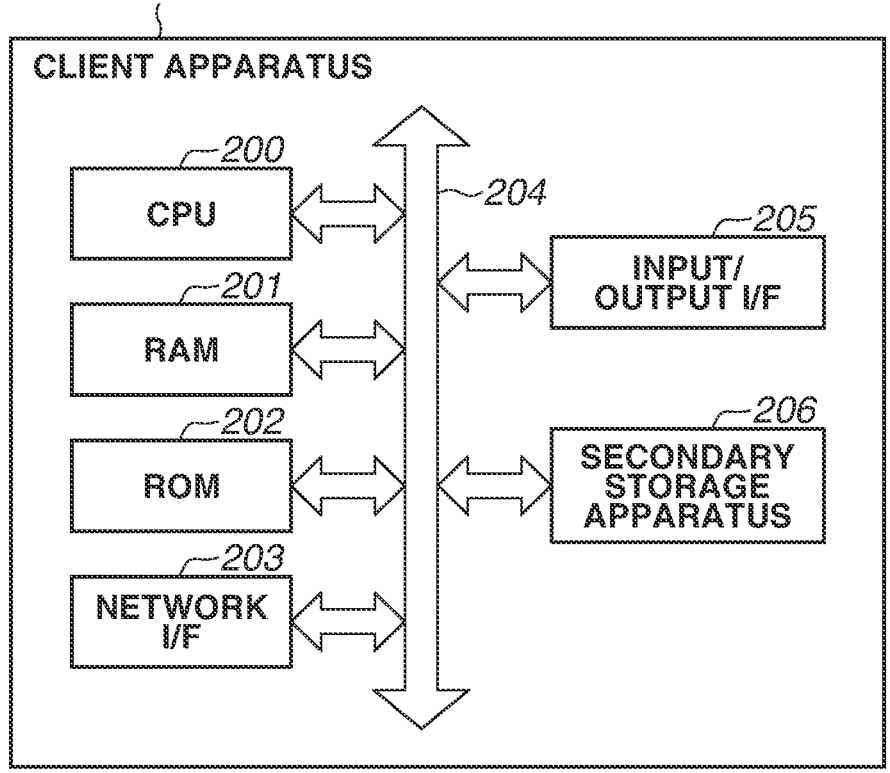
FIG. 2A is a block diagram illustrating a hardware configuration of a client apparatus.

FIG. 2A illustrates a hardware configuration of the client apparatus 100.

A central processing unit (CPU) 200 executes a program read from a random-access memory (RAM) 201, a read-only memory (ROM) 202, or a secondary storage apparatus 206.

The RAM 201 is a temporary memory area. The ROM 202 records a built-in program and data.

A network interface (I/F) 203 is a network interface for connecting to a network such as a local area network (LAN) to communicate with another computer or network device. The communication can be either wired or wireless communication.

An input/output I/F 205 is an input/output interface for inputting and outputting information and signals via a display, a keyboard, a mouse, a touch panel, and a button. In a case of a computer that does not include these hardware components, the computer can be connected and operated from another computer using remote desktop or remote shell.

The secondary storage apparatus 206 is a storage apparatus exemplified by a hard disk drive (HDD) and a flash memory.

The above-described hardware components are connected via a system bus 204. In the present exemplary embodiment, unless otherwise specified, the system bus 204 transmits a control instruction from the CPU 200 to the hardware components connected to the system bus 204.

Figure 2B:
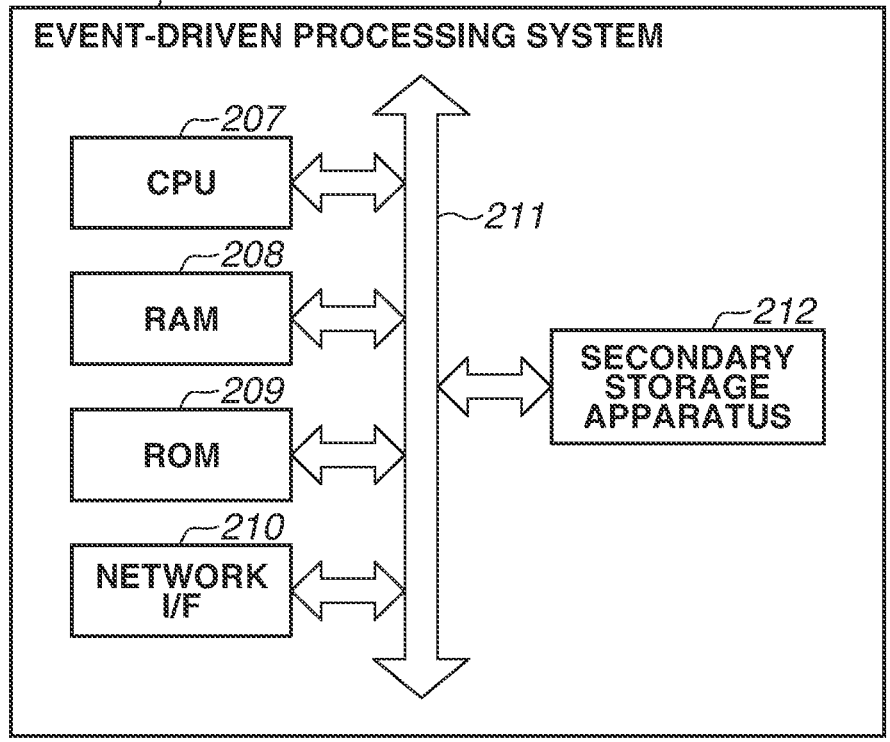
FIG. 2B is a block diagram illustrating a hardware configuration of an event-driven processing system.

FIG. 2B illustrates a hardware configuration of a server included in the event-driven processing system 102.

A CPU 207 executes a program read from a RAM 208, a ROM 209, or a secondary storage apparatus 212.

The RAM 208 is a temporary memory area. The ROM 209 records a built-in program and data.

A network I/F 210 is a network interface for connecting to a network such as a LAN to communicate with another computer or network device. The communication can be either wired or wireless communication.

The secondary storage apparatus 212 is a storage apparatus exemplified by a HDD and a flash memory.

The above-described hardware components are connected via a system bus 211. In the present exemplary embodiment, unless otherwise specified, the system bus 211 transmits a control instruction from the CPU 207 to the hardware components connected to the system bus 211.

The server included in the event-driven processing system 102 is provided as a cloud computing service. A function of each of the hardware components illustrated in FIG. 2B is implemented as application software by virtual machine software, and behaves similarly to a physical hardware element.

Figure 3:
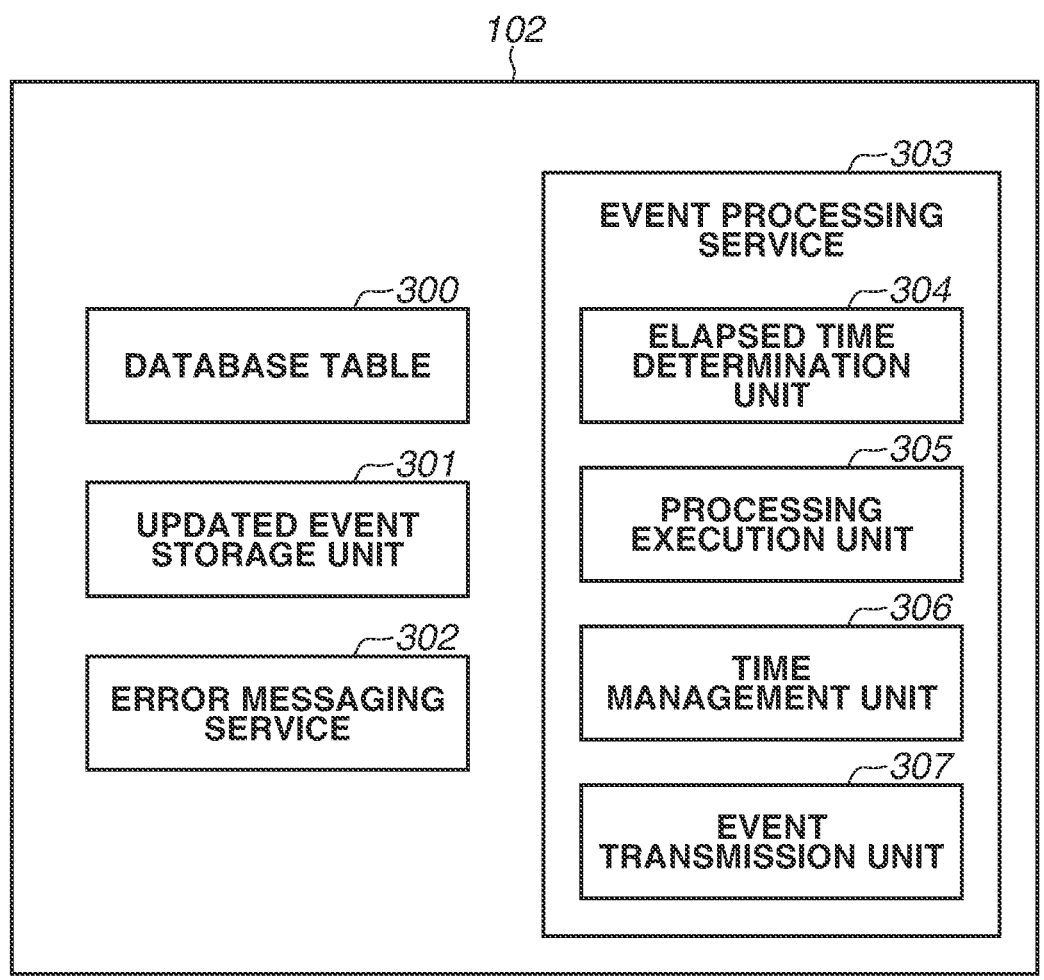
FIG. 3 is a block diagram illustrating a software configuration of the event-driven processing system according to a first exemplary embodiment.

FIG. 3 is a block diagram illustrating a software configuration (functional configuration) of the event-driven processing system 102 according to a first exemplary embodiment.

In the event-driven processing system 102, based on a request from the client apparatus 100, a database table 300 issues a stream event in response to a change (e.g., creation, update, deletion) made to an item managed in the database table 300. An updated event storage unit 301 stores the stream event issued by the database table 300. In the first exemplary embodiment, the term "stream event" refers to an event that indicates an update of the database table 300.

An error messaging service 302, as described later, receives the stream event from an event transmission unit 307 of an event processing service 303 in a case in which the processing for executing the program code is abnormally ended due to an abnormality such as an exception or a timeout. Then, the error messaging service 302 transmits an error message to a pre-registered destination.

The event processing service 303 performs polling on the updated event storage unit 301, and if there is an unprocessed stream event, the event processing service 303 processes the unprocessed stream event.

The event processing service 303 does not need server provisioning or management and is implemented by a mechanism configured to execute the program code using a resource allocated by the system for a predetermined event.

At a start of event processing, an elapsed time determination unit 304 of the event processing service 303 first determines an execution state. The execution state herein includes two types, a normal execution state and a preparation-for-termination execution state.

In the normal execution state, a processing execution unit 305 of the event processing service 303 executes the registered program code if a stream event occurs. In a case in which an exception occurs at the time of executing the program code or in a case in which elapsed time exceeds an allowable range (predetermined length of time), i.e., a timeout occurs, the event processing service 303 cancels execution of the program code if the program code is being executed. Then, the event processing service 303 retries to execute the program code until a predetermined period of time that is predefined passes after the elapsed time determination unit 304 determines that the predetermined length of time has passed.

In the preparation-for-termination execution state, the processing execution unit 305 of the event processing service 303 executes the program code while a time management unit 306 of the event processing service 303 counts the elapsed time. In a case in which an exception or a timeout occurs at the time of executing the program code, the event processing service 303 ends the processing for executing the program code if the program code is being executed. Then, the event processing service 303 transmits a stream event from the event transmission unit 307 to the error messaging service 302.

Figure 4:
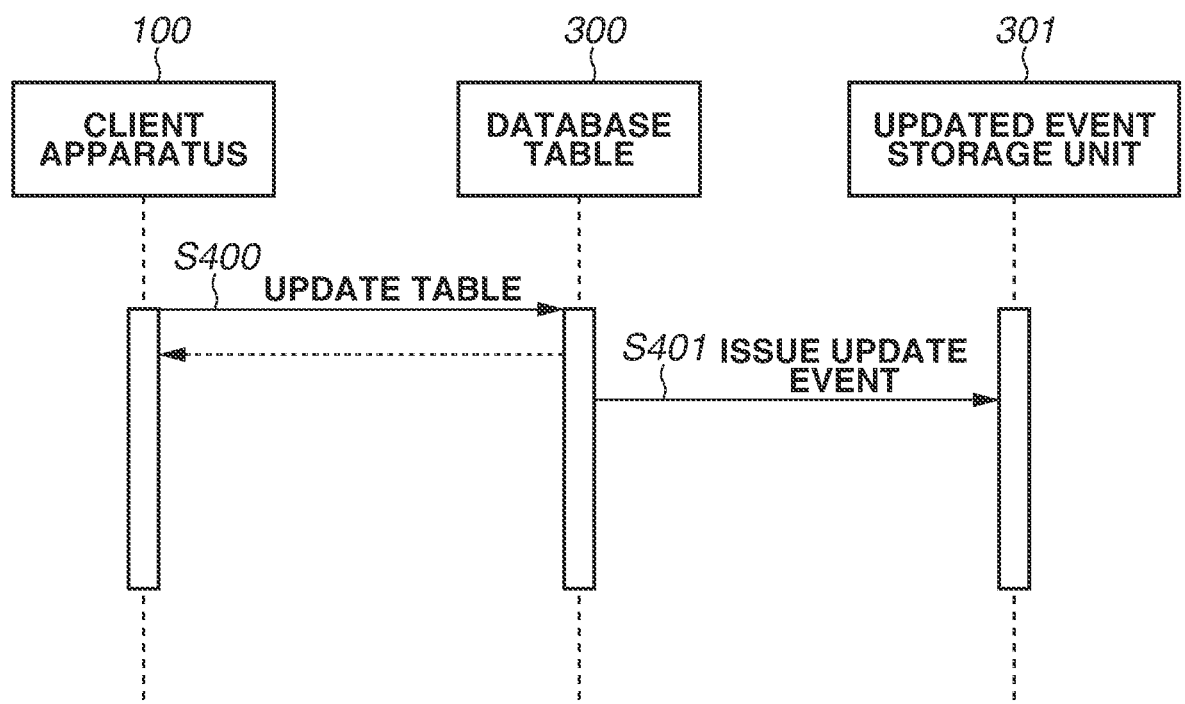
FIG. 4 is a sequence diagram illustrating a sequence of issuing an update event.

FIG. 4 is a sequence diagram illustrating processing for issuing an update event with respect to the database table 300.

First, in step S400, the client apparatus 100 instructs the database table 300 of the event-driven processing system 102 to update the database table 300. Examples of the database table 300 include a database that holds information about a status of a computer as the client apparatus 100 and information about consumables of an image processing apparatus as the client apparatus 100. In addition, examples of a table update include registration of a new record and update or deletion of an existing record.

Then, in step S401, the database table 300 issues contents of the table update as a stream event on the updated event storage unit 301. Herein, the update event of the table is written in a data description language such as JavaScript Object Notation (JSON).

A program executed by the client apparatus 100 in the sequence is read from the RAM 201, the ROM 202, or the secondary storage apparatus 206 and is executed by the CPU 200. Further, a program relating to the database table 300 is read from the RAM 208, the ROM 209, or the secondary storage apparatus 212 and is executed by the CPU 207.

An example of the database table update event will be described below in a JSON format. The example describes an event of updating a "status" value of a record having a main key "101" from "STARTED" to "SUCCEEDED".

```
{
  "Records": [
    {
      "event-id": "1",
      "event-version": "1.0",
      "database": {
        "Keys": {
          "Id": "{
            "Number": "101"
          }
        },
        "OldImage": {
          "Id": {
            "Number": "101"},
          "status": {
            "String": "STARTED"
          }
        },
        "NewImage": {
          "Id": {
            "Number": "101"
          },
          "status": {
            "String": "SUCCEEDED"
          }
        }
      },
      "event-name": "MODIFY",
      "event-source": "database"
    }
  ]
}
```

Figure 5:
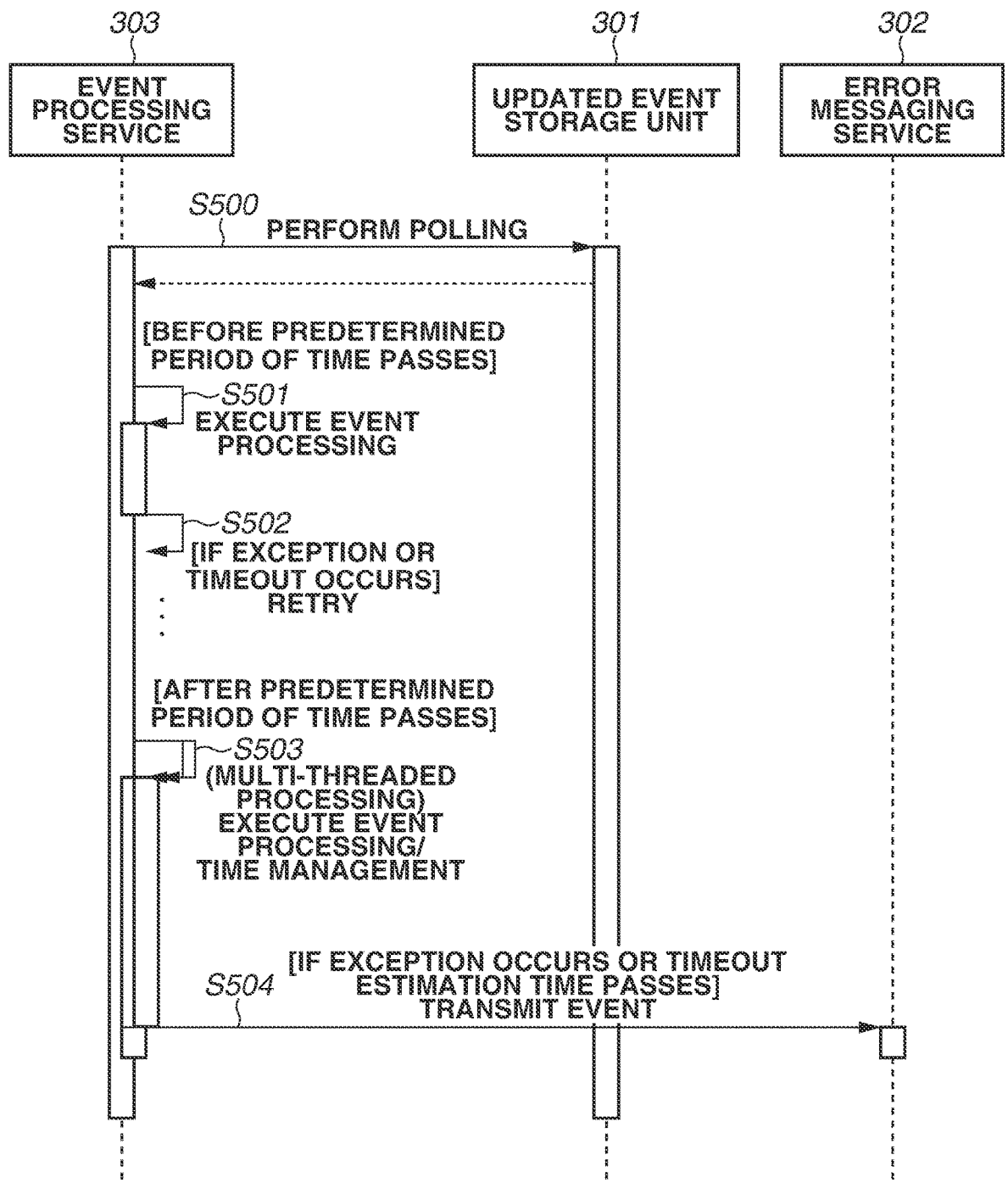
FIG. 5 is a sequence diagram illustrating an example of event processing performed by the event-driven processing system according to the first exemplary embodiment.

FIG. 5 is a sequence diagram illustrating an example of the entire processing including the event processing performed by the event-driven processing system 102.

First, in step S500, the event processing service 303 performs polling on the updated event storage unit 301 to acquire a stream event. The stream event herein is an event for updating the database table. The updated event storage unit 301 can manage a plurality of stream events, and in this example, the plurality of stream events is transmitted to the event processing service 303 in chronological order. The updated event storage unit 301 manages each of the stream events only for a predetermined period of time. The stream event that has exceeded this period of time is deleted by the updated event storage unit 301. The stream event that is deleted is not transmitted to the event processing service 303.

Meanwhile, the elapsed time determination unit 304 of the event processing service 303 calculates an elapsed time from an occurrence of the stream event using a current time point, and determines the execution state based on whether the elapsed time is shorter than a predetermined length of time that is predefined.

As described above, the execution state has two types, and the first execution state is the normal execution state.

In the case of the normal execution state, first, in step S501, the processing execution unit 305 of the event processing service 303 executes the program code that is preregistered in association with the acquired stream event. Accordingly, the event processing is executed.

If the execution of the program code is normally ended, the processing by the event processing service 303 is ended. On the other hand, if the execution of the program code is ended due to an occurrence of an exception or a timeout, then in step S502, the program code is re-executed on the same stream event until a predetermined period of time that is predefined passes.

In the case in which the program code is re-executed, if the elapsed time from the occurrence of the stream event exceeds the predetermined length of time, the event processing service 303 performs the processing in the preparation-for-termination execution state, which is the second execution state.

In the case of the preparation-for-termination execution state, in step S503, the event processing service 303 establishes a second thread (multi-threaded processing). In a first thread, the processing execution unit 305 executes the above-described program code that is pre-registered in association with the stream event acquired in step S500. In the second thread, the time management unit 306 counts an elapsed time from a start of the execution of the program code that is executed in the first thread.

At this time, a time length (hereinafter, referred to as "timeout estimation time") of a difference between a length of time up to the occurrence of a timeout during the execution of the program code and a length of time that is long enough to output an error is predefined. For example, in a case in which the length of time up to the occurrence of a timeout is five minutes and one minute is long enough to output an error, the timeout estimation time is four minutes.

If the event processing on the target stream event in the first thread is normally ended, the processing by the event processing service 303 is ended.

On the other hand, if the event processing in the first thread is not normally ended and is ended due to the occurrence of an exception, then in step S504, the event transmission unit 307 transmits the stream event to the error messaging service 302. Then, the processing by the event processing service 303 is ended.

If the timeout estimation time passes in the second thread before the execution of the program code in the first thread is normally ended or is ended due to the occurrence of an exception, the event processing service 303 cancels the execution of the program code in the first thread at this time point. Then, in step S504, the event transmission unit 307 transmits the stream event to the error messaging service 302. Then, the processing by the event processing service 303 is ended.

An error notification destination is pre-registered in the error messaging service 302 as a destination. The error notification destination is, for example, an email address of a development staff member, a chat service, or a project management tool.

In a case in which stream events consecutively occurs, if the execution state is the normal execution state, a previous stream event is processed in step S501, and after the previous stream event is normally ended, step S500 is re-executed to process a subsequent stream event.

There is a case in which, at the time when the processing of the previous stream event is ended in step S504 and thereafter the subsequent stream event is acquired in step S500, the elapsed time from the occurrence of the event already exceeds the predetermined length of time. In this case, the normal processing of steps S501 and S502 is skipped, and the subsequent stream event is processed in the preparation-for-termination execution state from the beginning.

The processing execution unit 305 of the event processing service 303 in the sequence does not need server provisioning or management and is implemented by a mechanism configured to execute the program code using a resource allocated by the system for a predetermined event.

FIGS. 6A, 6B1, and 6B2 are flowcharts illustrating details of the processing performed by the event processing service 303 in the sequence illustrated in FIG. 5. A start of the process illustrated in the flowcharts is triggered by an occurrence of a stream event.

Figure 6A:
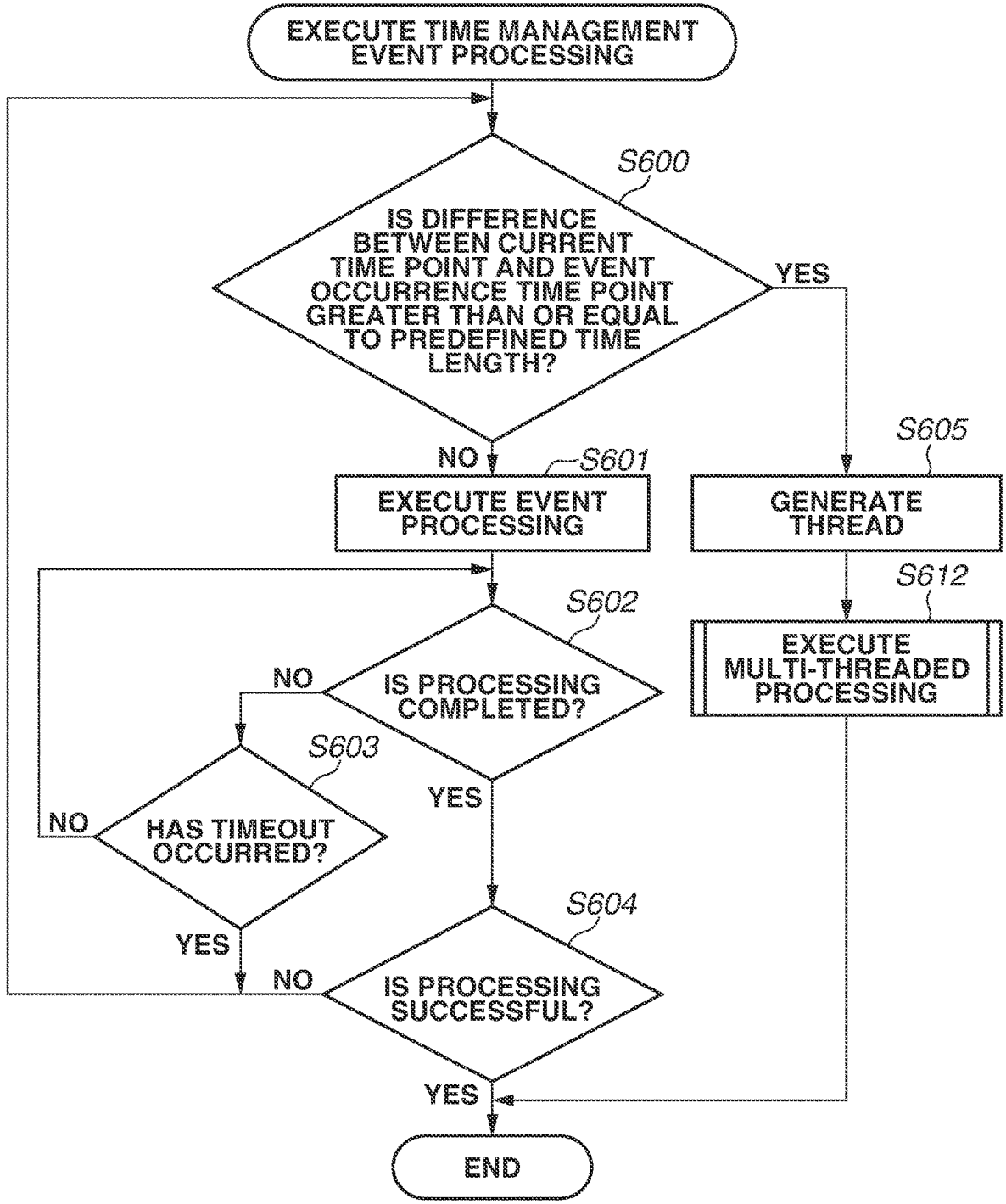
FIG. 6A is a flowchart illustrating a flow of processing according to the first exemplary embodiment.

In step S600 in the flowchart in FIG. 6A, at the time of executing the program code, the elapsed time determination unit 304 of the event processing service 303 first checks a difference between a current time point and an event occurrence time point.

In step S600, if the difference between the current time point and the time point at which the processing target event occurs is less than a predetermined length of time that is predefined (NO in step S600), then in step S601, the processing execution unit 305 executes the program code corresponding to the target event in order to process the target event. The "predetermined length of time" used in the determination in step S600 is shorter than the predetermined period of time during which each of the stream events is managed by the updated event storage unit 301 until the stream event is deleted.

Then, in step S602, the processing execution unit 305 checks whether the processing is completed.

If the processing is not completed (NO in step S602), then in step S603, the elapsed time determination unit 304 determines whether a timeout (e.g., five minutes) has occurred before the processing is completed.

If the timeout has occurred (YES in step S603), the elapsed time determination unit 304 retries the processing from the condition determination in step S600.

On the other hand, if the processing is ended before the timeout occurs (YES in step S602), then in step S604, the processing execution unit 305 determines whether the processing is successful.

If the processing is successful (YES in step S604), the processing performed by the event processing service 303 is ended. On the other hand, if the processing is unsuccessful (e.g., ended due to an exception) (NO in step S604), the elapsed time determination unit 304 retries the processing from the condition determination in step S600.

If the difference between the current time point and the event occurrence time point that is checked by the elapsed time determination unit 304 is greater than or equal to the predetermined length of time (e.g., one hour or longer) (YES in step S600), then in step S605, the processing execution unit 305 generates a new thread (the second thread). One of the cases in which the elapsed time determination unit 304 determines that the difference is greater than or equal to the predetermined length of time in step S600 (YES in step S600) is a case in which the processing is retried a number of times with respect to one stream event according to the determination result in step S603 or step S604. Another case in which the elapsed time determination unit 304 determines that the difference is greater than or equal to the predetermined length of time in step S600 (YES in step S600) is a case in which a plurality of stream events occurs consecutively and substantially simultaneously and the processing of a previous event is already retried a number of times at the time when a subsequent event is acquired. In the latter case, the processing sometimes proceeds to step S605 without executing step S601. Then, in step S612, the multi-threaded processing illustrated in FIGS. 6B1 and 6B2 is started.

FIG. 6B1 is a flowchart illustrating the processing that is executed in the first thread. In step S606, the processing execution unit 305 executes the program code corresponding to the stream event and executes the event processing, as in step S601.

FIG. 6B2 is a flowchart illustrating the processing that is executed in the second thread generated in step S605 and is executed simultaneously with the processing executed in the first thread. In step S610, the time management unit 306 counts the elapsed time from the generation of the thread.

First, the processing in the second thread illustrated in FIG. 6B2 will be described below.

If the elapsed time from the generation of the thread that is started counting in step S610 reaches the timeout estimation time (e.g., four minutes), then at this time point, in step S611, the processing execution unit 305 cancels the execution of the program code that is started in step S606. Since the timeout estimation time is a length of time corresponding to one event processing, the timeout estimation time is generally defined as a shorter time than the predetermined length of time in step S600.

Then, in step S612, the event transmission unit 307 transmits a stream event to the error messaging service 302.

Thus, the processing by the event processing service 303 is ended.

Next, the processing in the first thread illustrated in FIG. 6B1 will be described below.

If the event processing started by executing the program code in step S606 is completed before the elapsed time from the generation of the thread in FIG. 6B2 reaches the timeout estimation time, then in step S607, the time management unit 306 cancels counting of the elapsed time.

Then, in step S608, the processing execution unit 305 determines whether the event processing performed by executing the program code is successful. If the processing is successful (YES in step S608), the processing performed by the event processing service 303 is ended.

On the other hand, if the event processing is unsuccessful (NO in step S608), then in step S609, the event transmission unit 307 transmits a stream event to the error messaging service 302 at this time point. In this case, the event processing is not retried, unlike the processing illustrated in FIG. 6A. Subsequently, the processing performed by the event processing service 303 is ended.

As described above, according to the first exemplary embodiment, in the case in which the predetermined length of time that is predefined passes after the stream event occurs, the execution state is changed to the preparation-for-termination execution state so that the retries of the event processing are restricted. This prevents the processing from becoming stuck for a long time due to the updated event storage unit 301 repeatedly retrying the stream event until the stream event is automatically deleted.

According to the first exemplary embodiment, even in the case in which the stream events occur consecutively and the previous stream event is retried a number of times, it is ensured that the subsequent stream event is processed at least once.

According to the first exemplary embodiment, since the updated event storage unit 301 automatically deletes the stream event, cancellation of a retry of the stream event does not occur, whereby a failure notification of the event processing is reliably issued via the error messaging service 302.

Next, a second exemplary embodiment will be described below mainly with regard to a difference from the first exemplary embodiment.

FIG. 7 is a block diagram illustrating a software configuration (functional configuration) of an event-driven processing system 102 according to the second exemplary embodiment.

According to the first exemplary embodiment, the event processing service 303 executes the processing in the event-driven processing system 102. On the other hand, according to the second exemplary embodiment, an event transfer service 700 including an event conversion unit 701, an event processing service 705 including a processing execution unit 706, an event messaging service 703, and an error notification queue 704 execute the processing.

The event transfer service 700 and the event processing service 705 do not need server provisioning or management and are implemented by a mechanism configured to execute the program code using a resource allocated by the system for a predetermined event.

FIG. 8 is a sequence diagram illustrating an example of the event processing performed by the event-driven processing system 102 according to the second exemplary embodiment.

According to the second exemplary embodiment, in step S800, the event transfer service 700 performs polling to acquire a stream event. The stream event herein refers to a database table update event as in the first exemplary embodiment.

Then, if the stream event is a batch-processed event, the event transfer service 700 divides the stream event into individual events. At this time, in step S801, the event conversion unit 701 converts a format of the event for the subsequent processing. The event conversion processing can also be skipped.

Then, in step S802, an event transmission unit 702 of the event transfer service 700 transfers the processed event to the event messaging service 703.

In step S803, in order to perform event notification, the event messaging service 703 notifies the event processing service 705 of the event transferred from the event transfer service 700. The event processing service 705 is pre-registered as a destination in the event messaging service 703. If a plurality of events is transferred from the event transfer service 700, the event messaging service 703 notifies the event processing service 705 of the plurality of events in an order in which the plurality of events is transferred.

In step S804, the event processing service 705 executes the program code that is pre-registered in association with the stream event in response to the notification from the event messaging service 703.

If the processing is ended normally before a timeout occurs, the processing by the event processing service 705 is ended.

The notification from the event messaging service 703 to the event processing service 705 is performed in the order in which the events are transferred. However, in the processing of step S804, when the program codes of the consecutively notified events are sequentially executed and the event processing is simultaneously executed, timing at which the event processing of a subsequent event is completed can precede timing at which the event processing of a previous event is completed.

On the other hand, if the event processing based on the execution of the program code is ended due to an occurrence of an exception or a timeout, then in step S805, the event processing service 705 retries the event processing until the number of retries reaches a predetermined number that is predefined.

If the number of unsuccessful retries already exceeds the predetermined number, then at this time point, in step S806, the event processing service 705 transmits the stream event to the error notification queue 704. Then, the processing by the event processing service 705 is ended.

Then, in step S807, the queue 704 transmits the stream event to the error messaging service 302 registered as a destination.

FIG. 9 is a flowchart illustrating details of the processing performed by the event processing service 705 in the sequence illustrated in FIG. 8.

First, in step S900, the processing execution unit 706 in the event processing service 705 receives a notification about the stream event from the event messaging service 703.

Then, in step S901, in response to the notification from the event messaging service 703, the processing execution unit 706 controls execution of the event processing by executing the program code that is pre-registered in association with the stream event.

Then, in step S902, the processing execution unit 706 checks whether the event processing is completed.

If the event processing is completed (YES in step S902), then in step S904, the processing execution unit 706 checks whether the processing is successful. If the processing is successful (YES in step S904), the processing by the event processing service 705 is ended.

On the other hand, if the event processing is not completed (NO in step S902), then in step S903, the processing execution unit 706 checks whether a timeout has occurred. If the timeout has not occurred (NO in step S903), the processing returns to step S902.

If the event processing is ended due to an occurrence of an exception (NO in step S904), or if the timeout has occurred (YES in step S903), then in step S905, the processing execution unit 706 determines whether the number of retries executed in the case of the end due to the exception or the timeout exceeds a predetermined number that is predefined.

If the number of retries does not exceed the predetermined number (NO in step S905), then in step S901, the processing execution unit 706 re-executes the program code to retry the event processing.

On the other hand, if the number of retries exceeds the predetermined number (YES in step S905), then in step S906, an event transmission unit 707 notifies the error notification queue 704 of the stream event.

Thus, the processing by the event processing service 705 is ended.

As described above, according to the second exemplary embodiment, the event-driven computing service is activated based on a message via the event messaging service 703. If the number of retries executed in the cases of unsuccessful event processing exceeds the predetermined number that is defined, the stream event is transmitted as an error message to the queue 704.

Accordingly, an error notification is provided if the number of failures reaches the predetermined number without the need to manage the number of retries on a developer side while the processing is prevented from becoming stuck in the cases in which the event-driven computing service processes a stream event from a database.

Next, a third exemplary embodiment will be described below mainly with regard to a difference from the first and second exemplary embodiments.

Figure 10:
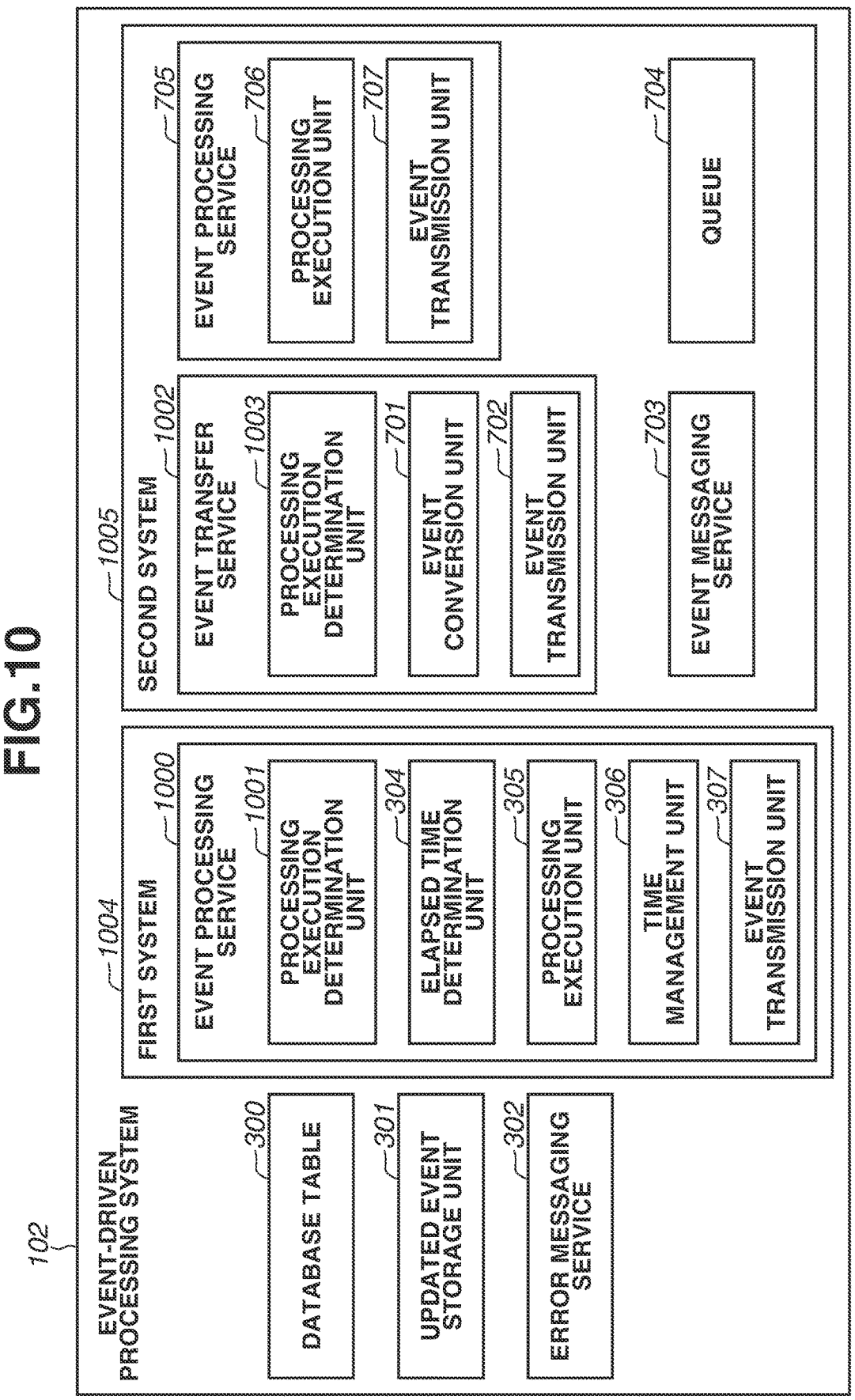
FIG. 10 is a block diagram illustrating a software configuration of an event-driven processing system according to a third exemplary embodiment.

FIG. 10 is a block diagram illustrating a software configuration (functional configuration) of an event-driven processing system 102 according to the third exemplary embodiment.

The event-driven processing system 102 according to the third exemplary embodiment includes, in combination, the functional configuration of the processing system ("first system 1004") according to the first exemplary embodiment illustrated in FIG. 3 and the functional configuration of the processing system ("second system 1005") according to the second exemplary embodiment illustrated in FIG. 7.

An event processing service 1000, which corresponds to the event processing service 303 according to the first exemplary embodiment, further includes a processing execution determination unit 1001 configured to determine whether a polled stream event is to be executed. Further, an event transfer service 1002, which corresponds to the event transfer service 700 according to the second exemplary embodiment, further includes a processing execution determination unit 1003.

The event processing service 1000 and the event transfer service 1002 do not need server provisioning or management and are implemented by a mechanism configured to execute the program code using a resource allocated by the system for a predetermined event.

Since the event-driven processing system 102 according to the third exemplary embodiment is a combination of the first system 1004 according to the first exemplary embodiment and the second system 1005 according to the second exemplary embodiment, the event-driven processing system 102 can also be referred to as a "hybrid processing system".

In the third exemplary embodiment, the systems 1004 and 1005 according to the first and second exemplary embodiments are used in combination so that advantages of both of the systems can be enjoyed.

In the third exemplary embodiment, each stream event type is associated with one of the processing systems, i.e., either the first system 1004 or the second system 1005, and is registered in an event identification map. Then, the first system 1004 or the second system 1005 is selected depending on the stream event type.

More specifically, the first system 1004 is selected for a stream event type that requires an order of events to be strictly maintained based on, in particular, the order in which the events are registered in a case of managing the events in substantially real time. In the second system 1005, the processing order is maintained to some extent and, in a case in which many events frequently occur, the time needed to execute the event processing on all of the events is relatively shorter than that in the first system 1004. An administrator can select any one of the processing systems that is suitable for the event type.

Figure 11:
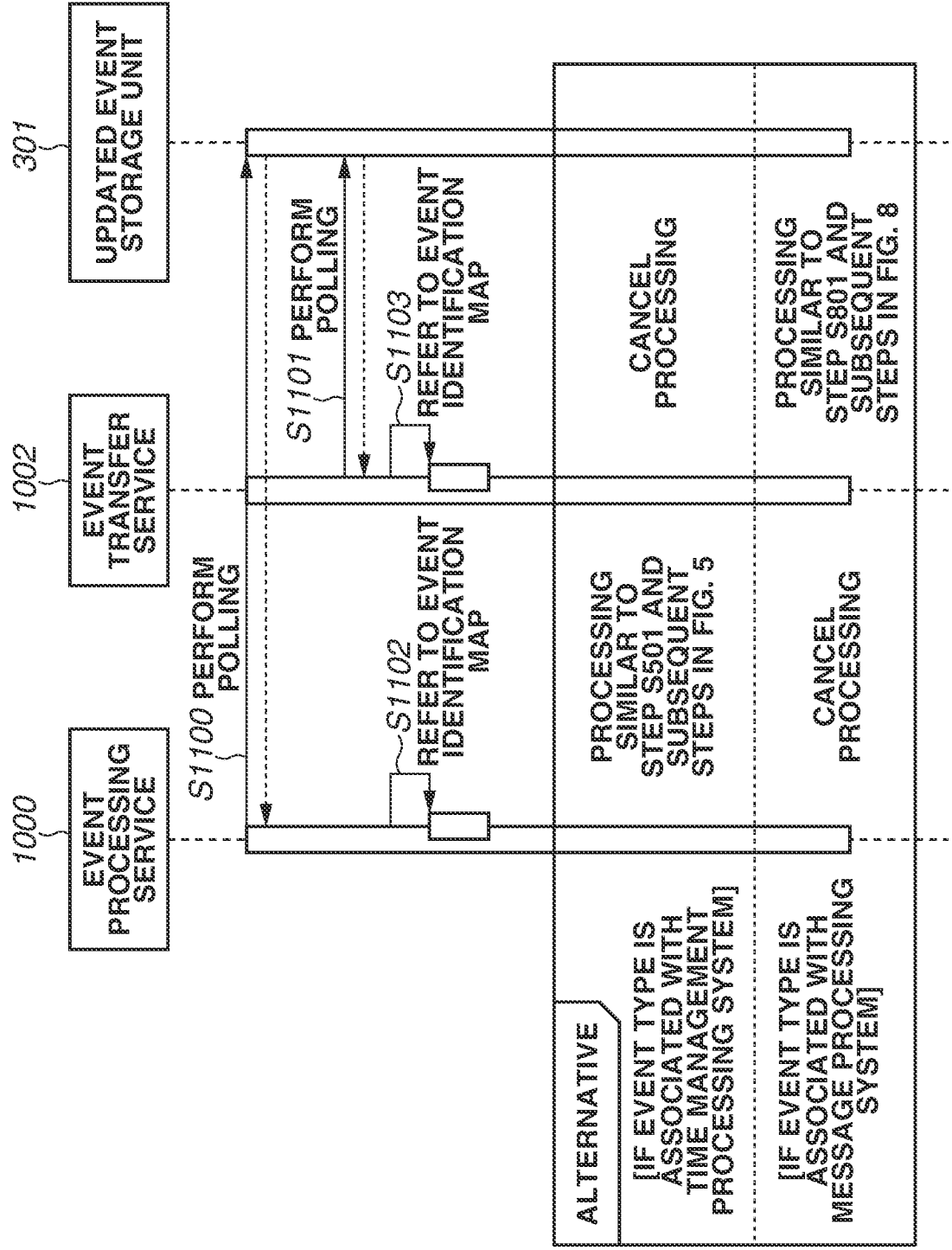
FIG. 11 is a sequence diagram illustrating an example of event processing performed by the event-driven processing system according to the third exemplary embodiment.

FIG. 11 is a sequence diagram illustrating an example of the event processing performed by the event-driven processing system 102 according to the third exemplary embodiment.

First, in step S1100, the event processing service 1000 of the first system 1004 performs polling on the updated event storage unit 301 to acquire a stream event. Then, in step S1101, the event transfer service 1002 of the second system 1005 performs polling on the updated event storage unit 301 to acquire a stream event. The stream event herein refers to a database table update event as in the first and second exemplary embodiments.

Next, in step S1102, the event processing service 1000 refers to the event identification map and determines whether to execute the program code. Further, in step S1103, the event transfer service 1002 also refers to the event identification map and determines whether to execute the program code.

The event identification map herein refers to a map that records each stream event type in association in advance with the first system 1004 or the second system 1005 that is to be executed. The event identification map can be externally held as a file in a JSON format or can be directly written into the program.

If the type of the received stream event is associated with the first system 1004, the event processing service 1000 of the first system 1004 performs step S501 and the subsequent steps illustrated in the sequence in FIG. 5. The event transfer service 1002 of the second system 1005 does not perform processing, and the processing is ended.

On the other hand, if the type of the received stream event is associated with the second system 1005, the event processing service 1000 of the first system 1004 does not perform the processing, and the processing is ended. The event transfer service 1002 of the second system 1005 performs step S801 and the subsequent steps illustrated in the sequence diagram in FIG. 8.

The event processing service 1000 and the event transfer service 1002 in the sequence do not need server provisioning or management. The event processing service 1000 and the event transfer service 1002 are implemented by a mechanism configured to execute a program code using a resource allocated by the system for a predetermined event.

An example of a stream event that is associated with the first system 1004 because execution of the program code corresponding to the stream event is not idempotence is a counter value addition event of paper in an image forming apparatus. In this case, if the program code is executed more than once, an error occurs in a count value to be added.

An example of the counter value addition event will be described in a JSON format below. This is an example of the counter value addition event in a case of monochrome printing on a recycled paper using a device having a tenant ID "1000BA" and a device ID "200-aaa".

```
{
  "Records": [
    {
      "event-id": "1",
      "event-version": "1.0",
      "database": {
```

-continued

```
        "Keys": {
          "HashKey": "{
            "String": "device|1000BA|200-aaa"
          }
        },
        "OldImage": {
          "HashKey": "{
            "String": "device|1000BA|200-aaa"
          },
          "Counter": {
            "String": "140"
          },
          "Black_and_White": {
            "String": "110"
          },
          "Recycles_Paper": {
            "String": "25"
          }
        },
        "NewImage": {
          "HashKey": "{
            "String": "device|1000BA|200-aaa"
          },
          "Counter": {
            "String": "141"
          },
          "Black_and_White": {
            "String": "111"
          },
          "Recycles_Paper": {
            "String": "26"
          }
        }
      },
      "event-name": "MODIFY",
      "event-source": "database"
    }
  ]
}
```

Further, an example of execution of a program code in which an order does not have to be maintained and that is idempotence is processing in which backup records registered in a database table are deleted except for a predetermined number of latest backup records in response to a backup successful event of the device. In this case, even if the order is changed or the program code is executed more than once, the number of backup records that remains at the end is the same, so that no defect is likely to occur.

An example of the backup successful event will be described in a JSON format below. This is an example of an event of updating a status of a backup that has a backup ID "1111-2345" associated with a tenant ID "1000BA" from "started" to "successful".

```
{
  "Records": [
    {
      "event-id": "1",
      "event-version": "1.0",
      "database": {
        "Keys": {
          "HashKey": "{
            "String": "backup|1000BA"
          }
        },
        "OldImage": {
          "HashKey": "{
            "String": "backup|1000BA"
          },
          "backup_id": {
            "String": "1111-2345"
          },
          "status": {
```

```
            "String": "STARTED"
          }
        },
        "NewImage": {
          "HashKey": "{
            "String": "backup|1000BA"
          },
          "backup_id": {
            "String": "1111-2345"
          },
          "status": {
            "String": "SUCCEEDED"
          },
          "received_at": {
            "String": "2018-01-01T07:00:00.000Z"
          },
          "file_id": {
            "String": "20180101-070000.zip"
          }
        }
      },
      "event-name": "MODIFY",
      "event-source": "database"
    }
  ]
}
```

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-174455, filed Sep. 19, 2018, which is hereby incorporated by reference herein in its entirety.

What is claimed is:

1. A system configured to manage, for a first time length, a plurality of events issued in response to a plurality of changes made to a database and execute a code corresponding to each of the plurality of changes in response to the plurality of events to process the plurality of events in chronological order, the system comprising:
one or more processors; and
at least one memory storing instructions, which when executed by the one or more processors, cause the system to:
manage status information for event processing as first execution status if a difference between a current time point and a time point at which a target event of the event processing occurs is not greater than a second time length, the second time length being shorter than the first time length;
perform control to retry the event processing on the target event if first event processing that is started in the first execution status as the event processing is not normally ended;
manage the status information for the event processing as second execution status if a difference between a current time point and the time point at which the target event of the event processing occurs is greater than the second time length; and
execute, without the control to retry, processing for failure notification of the event processing on the target event if second event processing that is started in the second execution status as the event processing is not normally ended.

2. The system according to claim 1, wherein the instructions, when executed by the one or more processors, further cause the system to:
generate a second thread different from a first thread for executing the second event processing in the case in which the difference between the current time point and the time point at which the processing target event occurs is greater than the second time length;
perform, in the generated second thread, control to cancel the second event processing if it is determined that only a third time length has passed; and
execute, in the generated second thread, the processing for the failure notification if the second event processing is cancelled,
wherein the processing for the failure notification is executed in the first thread if the second event processing is not normally ended.

3. The system according to claim 2, wherein the third time length is shorter than the second time length.

4. A system configured to manage, for a first time length, a plurality of events issued in response to a plurality of changes made to a database and execute a code corresponding to each of the plurality of changes in response to the plurality of events to process the plurality of events, the system comprising:
one or more processors; and
at least one memory storing instructions, which when executed by the one or more processors, cause the system to:
notify a first messaging service of the issued event in response to the issued event; and
control event processing on the issued event in response to an event notification from the first messaging service,
wherein in a case where the event processing is ended due to an occurrence of an exception or a timeout, a retry of the event processing is executed,
wherein in a case where the event processing is ended due to an occurrence of an exception or a timeout and a number of retries is greater than a predetermined number, processing for failure notification of the event processing on the issued event is executed, and wherein in the processing for failure notification of the event processing, a second messaging service is notified, via a queue, of the event for which the processing has failed.

5. A method in a system configured to manage, for a first time length, a plurality of events issued in response to a plurality of changes made to a database and execute a code corresponding to each of the plurality of changes in response to the plurality of events to process the plurality of events in chronological order, the method comprising:

managing status information for event processing as first execution status if a difference between a current time point and a time point at which a target event of the event processing occurs is not greater than a second time length, the second time length being shorter than the first time length;

performing control to retry the event processing on the target event if first event processing that is started in the first execution status as the event processing is not normally ended;

managing the status information for the event processing as second execution status if a difference between a current time point and the time point at which the target event of the event processing occurs is greater than the second time length; and executing, without the control to retry, processing for failure notification of the event processing on the target event if second event processing that is started in the second execution status as the event processing is not normally ended.

6. A method in a system configured to manage, for a first time length, a plurality of events issued in response to a plurality of changes made to a database and execute a code corresponding to each of the plurality of changes in response to the plurality of events to process the plurality of events, the method comprising:

notifying a first messaging service of the issued event in response to the issued event; and controlling event processing on the issued event in response to an event notification from the first messaging service, wherein in a case where the event processing is ended due to an occurrence of an exception or a timeout, a retry of the event processing is executed, wherein in a case where the event processing is ended due to an occurrence of an exception or a timeout and a number of retries is greater than a predetermined number, processing for failure notification of the event processing on the issued event is executed, and wherein in the processing for failure notification of the event processing, a second messaging service is notified, via a queue, of the event for which the processing has failed.

* * * * *